(12) United States Patent
Amano et al.

(10) Patent No.: US 6,172,143 B1
(45) Date of Patent: Jan. 9, 2001

(54) RESIN COMPOSITION FOR USE IN SEALANT AND LIQUID SEALANT USING THE RESIN COMPOSITION

(75) Inventors: Satoshi Amano; Hideshi Tomita, both of Tokyo (JP)

(73) Assignee: Nisshinbo Industries, Inc., Tokyo (JP)

( * ) Notice: Under 35 U.S.C. 154(b), the term of this patent shall be extended for 0 days.

(21) Appl. No.: 09/228,389

(22) Filed: Jan. 12, 1999

(30) Foreign Application Priority Data

Jan. 13, 1998 (JP) .................................................. 10-017748

(51) Int. Cl.$^7$ .............................. C08K 5/29; C08L 63/02
(52) U.S. Cl. .............................................. 523/461; 528/120
(58) Field of Search .............................. 528/120; 523/461

(56) References Cited

U.S. PATENT DOCUMENTS 5,393,839 * 2/1995 Iwamoto .............................. 525/111

OTHER PUBLICATIONS

Lee & Neville, Handbook of Epoxy Resins (1967) p. 11–2, 1967.*

* cited by examiner

*Primary Examiner*—Robert Dawson
*Assistant Examiner*—D. Aylward
(74) *Attorney, Agent, or Firm*—Kubovcik & Kubovcik

(57) ABSTRACT

A resin composition for use in a liquid sealant, which is composed mainly of an epoxy compound, an epoxy resin curing agent and a polycarbodiimide resin, the proportion of the polycarbodiimide resin being 0.1 to 10 parts by weight relative to 100 parts by weight of the epoxy compound, and which is liquid or fluid at ordinary temperature. The liquid sealant comprises a resin composition which is composed mainly of an epoxy compound and a polycarbodiimide resin, the proportion of the polycarbodiimide resin being 0.1 to 10 parts by weight relative to 100 parts by weight of the epoxy compound, an epoxy resin curing agent, an epoxy resin curing accelerator and an inorganic powder. The sealant is liquid or fluid at ordinary temperature.

6 Claims, No Drawings

RESIN COMPOSITION FOR USE IN SEALANT AND LIQUID SEALANT USING THE RESIN COMPOSITION

BACKGROUND OF THE INVENTION

1. Field of the Invention

The present invention relates to a resin composition for use in a liquid sealant and a liquid sealant using the resin composition. More particularly, the present invention relates to a resin composition for use in a liquid sealant, which is liquid and has moisture resistance and soldering heat resistance, as well as to a liquid sealant using the resin composition.

2. Description of Related Art

To electronic parts such as those obtained by mounting a semiconductor chip on a metal plate (which is a lead frame) and connecting them electrically using a bonding wire or the like, sealing has been conducted in order to improve, in particular, their reliability. As the sealant for such sealing, ceramics or thermosetting resins are used. Of these sealants, epoxy resin compositions are in wide use for the good balance between economy and properties.

In the fields of semiconductors and electronic parts, higher density, higher integration and smaller size have been strong requirements in recent years. To respond to such requirements, the lead frames or metal wires used in semiconductors or electronic parts are being made increasingly thinner and the circuit patterns used as well in semiconductors and electronic parts are being made increasingly finer.

In the fields of semiconductors and electronic parts, change is being seen also in the method for mounting a sealed electronic part on an electronic circuit, in keeping pace with the above-mentioned higher density and higher integration. As an example, in bonding an electronic part to a substrate with solder, a reflow soldering method (wherein the whole portion of an electronic part is heated) has come to be adopted.

When a substrate such as semiconductor chip of higher density, higher integration or smaller size is sealed according to a conventional transfer molding method, the substrate receives a high pressure during molding; as a result, the substrate easily gives rise to circuit disconnection or poor contact due to displacement of electrode and there has arisen a new problem of reduced yield due to the generation of defects.

In order to solve the above problem of the transfer molding method caused by the high pressure during molding, it is easily conceived of, for example, a new molding method of using a liquid resin (e.g. a liquid epoxy resin) so that substantially no pressure is applied to a substrate during molding. No liquid resin usable in such a molding method, however, has been provided.

Epoxy resin compositions for sealing, used in the conventional transfer molding method, generally have a high viscosity and are substantially unsuitable for use in the above-mentioned new molding method wherein a substrate receives substantially no molding pressure. Moreover, with these epoxy resin compositions, there have been cases that when they are used in mounting by reflow soldering method, the absorbed moisture present in epoxy resin receives thermal shock during mounting and generates peeling or cracking in cured resin; therefore, the epoxy resin compositions have a problem in reliability.

In the conventional transfer molding method, it was proposed as a measure for the above-mentioned reliability problem to (1) increase the amount of inorganic material used in epoxy resin composition for sealing, to reduce the proportion of epoxy resin (this resin is a moisture-absorbing source) or (2) use an epoxy resin of biphenyl type or dicyclopentadiene type skeleton which has a low moisture absorption and which is solid at ordinary temperature.

The epoxy resin compositions for sealing wherein the above measure is used, however, inevitably have a high viscosity. It is therefore apparent that they are unusable in the above-mentioned molding method wherein a substrate receives substantially no molding pressure.

SUMMARY OF THE INVENTION

The object of the present invention is to alleviate the above-mentioned problems of the prior art and provide (1) a resin composition for use in a liquid sealant, which is liquid and has moisture resistance and soldering heat resistance and (2) a liquid sealant using the resin composition.

The present invention provides a resin composition for use in a liquid sealant, which is composed mainly of an epoxy compound and a polycarbodiimide resin, the proportion of the polycarbodiimide resin being 0.1 to 10 parts by weight relative to 100 parts by weight of the epoxy compound, and which is liquid or fluid at ordinary temperature.

The present invention also provides a liquid sealant comprising:

a resin composition which is composed mainly of an epoxy compound and a polycarbodiimide resin, the proportion of the polycarbodiimide resin being 0.1 to 10 parts by weight relative to 100 parts by weight of the epoxy compound, an epoxy resin curing agent, an epoxy resin curing accelerator, and an inorganic powder, which liquid sealant is liquid or fluid at ordinary temperature.

DETAILED DESCRIPTION OF THE INVENTION

The present invention is hereinafter described in detail.

The epoxy compound used in the present invention is not a monofunctional compound but a compound having at least two epoxy groups in the molecule, and is preferably liquid at ordinary temperature. Specific examples thereof are bisphenol aromatic epoxy resins such as bisphenol A type, bisphenol F type and the like; and alicyclic epoxy resins such as 2,2-bis(3,4-epoxycyclohexyl)propane, 3,4-epoxycyclohexylmethyl-epoxycyclohex anecarboxylate and the like. At least one of these resins is used as a main material of the resin composition for a liquid sealant, of the present invention.

A solid epoxy compound can be used in combination with the liquid epoxy compound as long as the present liquid sealant described later is at least fluid at ordinary temperature. Such a solid epoxy compound can be exemplified by a high-molecular bisphenol A type epoxy resin, a cresol novolac type epoxy resin and a naphthalene type epoxy resin.

As the polycarbodiimide resin used in the present invention, there can be mentioned a compound having a carbodiimide group-containing repeating unit represented by the following formula (1):

(1)

wherein R is an isocyanate residue, and n is such an integer that the molecular weight of the polycarbodiimide resin becomes 100 to 50,000.

There is no particular restriction as to the process for producing the polycarbodiimide. The polycarbodiimide resin can be produced by, for example, a process which comprises subjecting an organic polyisocyanate to the decarboxylation and condensation of isocyanate group. The organic polyisocyanate to be subjected to the decarboxylation and condensation is preferably an organic diisocyanate. The organic diisocyanate can be exemplified by phenylene-1,3-diisocyanate, 2,4-tolylene diisocyanate, 2,6-tolylene diisocyanate, diphenylmethane-4,4'-diisocyanate, 3,3'-dimethylbiphenylene-4,4'-diisocyanate, 1,3-xylylene diisocyanate, tetramethylxylylene diisocyanate, dicyclohexylmethane-2,4'-diisocyanate, dicyclohexylmethane-4,4-diisocyanate, ethylene diisocyanate and hexamethylene-1,6-diisocyanate. These diisocyanates can be used singly or in admixture.

As the carbodiimidization catalyst used in the carbodiimidization reaction of the organic polyisocyanate, there can be mentioned, for example, phosphorene compounds such as 1-phenyl-2-phosphorene-1-oxide, 1-phenyl-3-methyl-2-phosphorene-1-oxide, 1-ethyl-3-methyl-2-phosphorene-1-oxide, 1-ethyl-2-phospho rene-1-sulfide, 1,3-dimethyl-2-phosphorene-1-sulfide and the like; metal carbonyl complexes such as pentacarbonyliron, nonacarbonyliron, hexacarbonyltungsten and the like; acetylacetonate complexes of iron, aluminum, chromium, zirconium, etc.; and phosphoric acid esters such as trimethyl phosphate, triethyl phosphate, triphenyl phosphate and the like.

The above carbodiimidization catalysts can be used singly or in admixture. The amount of the carbodiimization catalyst used is 30 parts by weight or less, preferably 0.01 to 10 parts by weight relative to 100 parts by weight of the organic diisocyanate.

The carbodiimidization reaction of the organic polyisocyanate needs no solvent or may use an appropriate solvent. When a solvent is used, the solvent can be any as long as it can dissolve the polycarbodiimide resin produced, during the synthesis. The solvent can be exemplified by halogenated hydrocarbon type solvents such as 1,1-dichloroethane, tetrachloroethylene, p-chlorobenzene and the like; ether type solvents such as tetrahydrofuran, dioxane, diethylene glycol dimethyl ether and the like; ketone type solvents such as 2-methylcyclohexanone, cyclohexanone, cycloheptanone, 2,4-dimethyl-3-heptanone and the like; aromatic hydrocarbon type solvents such as benzene, toluene, ethylbenzene and the like; and acetate type solvents such as 2-methoxyethyl acetate, diethylene glycol monomethyl ether acetate and the like.

The amount of the solvent used during the carbodiimidization reaction is preferably 99 to 50 parts by weight, more preferably 95 to 60 parts by weight based on the total weight of the reaction system. When the isocyanate concentration in the reaction system is too high, gelation tends to occur and, when the concentration is too low, the reaction does not proceed favorably; therefore, such isocyanate concentrations are not preferred. Incidentally, the reaction temperature varies depending upon the kinds of the solvent and isocyanate used, but is ordinarily 30 to 200° C.

The polycarbodiimide resin used in the present invention may have a controlled molecular weight, for example, by, in the production thereof, using at least one monoisocyanate as a terminal-blocking and molecular weight-controlling agent and stopping the polycondensation at a certain stage.

The monoisocyanate for terminal blocking and molecular weight control of the polycarbodiimide resin can be exemplified by phenyl isocyanate (ortho, meta or para), tolyl isocyanate, dimethylphenyl isocyanate, cyclohexyl isocyanate and methyl isocyanate.

As easily inferred, there can be used, as other terminal-blocking agents, derivatives of isocyanate-terminated compounds which can be easily produced by reacting about 1 mole of a compound having an OH, —NH$_2$, —COOH, —SH or —NH alkyl terminal, with 2 moles of an aromatic diisocyanate.

The polycarbodiimide resin used in the present invention has a number-average molecular weight as measured by gel permeation chromatography (GPC), of preferably 100 to 50,000, more preferably 300 to 20,000 (styrene-reduced value, the same applies hereinafter). Incidentally, n in the above formula (1) is such an integer that the molecular weight of the polycarbodiimide resin falls in this range.

In the terminal-nonblocked polycarbodiimide resin, a smaller number of carbodiimide groups in molecule results in a larger number of terminal isocyanate groups and tends to give rise to a carbodiimidization reaction more easily; therefore, there are cases that a carbodiimidization reaction takes place when a terminal-nonblocked polycarbodiimide resin is used in a liquid sealant and heat-cured, to generate carbon dioxide (this is not preferred for a liquid sealant). Hence, the terminal-nonblocked polycarbodiimide resin is preferably a polycarbodiimide resin having at least four carbodiimide groups in the molecule.

In the terminal-nonblocked polycarbodiimide resin, n in the formula (1) is such an integer that the number-average molecular weight of the polycarbodiimide resin becomes preferably 300 to 50,000, more preferably 800 to 20,000.

To reduce a viscosity of a mixture of the epoxy compound and the polycarbodiimide resin, the polycarbodiimide resin as well is preferably liquid at ordinary temperature. As a polycarbodiimide resin having high fluidity, there can be mentioned, for example, one having a tetramethylxylylene skeleton.

In the present invention, a liquid polycarbodiimide resin is preferred as mentioned above. However, even a polycarbodiimide which is solid at ordinary temperature, can be used by dissolving it in a solvent and mixing the solution with the epoxy compound, or by dispersing a powdery polycarbodiimide resin in the epoxy compound. The solvent-dissolved polycarbodiimide resin is mixed with the epoxy compound; the mixture is subjected to solvent removal to use as a dispersion having fluidity at ordinary temperature; or the mixture (which is a solution) itself is used as a solution. The powdery polycarbodiimide resin is mixed with the epoxy compound to use as a dispersion having fluidity at ordinary temperature, or, the dispersion is as necessary heated to use as a solution.

The resin composition for a liquid sealant, of the present invention is not restricted only to a composition comprising only the epoxy compound and the polycarbodiimide resin. The present resin composition may further comprise, for example, a monofunctional epoxy compound (which is called "reactive diluent") in order to reduce the viscosity of the resin composition. As such a reactive diluent, there can be mentioned, for example, phenyl glycidyl ether and a glycidyl ether of an aliphatic alcohol.

In the present resin composition for a liquid sealant, the proportions of the epoxy compound and the polycarbodiimide resin is 100 parts by weight of the epoxy compound and 0.1 to 10 parts by weight of the polycarbodiimide resin. When the proportion of the polycarbodiimide resin is lower than 0.1 part by weight, the moisture resistance of the resulting composition is insufficient; when the proportion of the polycarbodiimide resin is higher than 10 parts by weight, the cost of the resulting composition is high because a reaction system control becomes necessary; therefore, these proportions are not preferred.

The liquid sealant of the present invention comprises:
  the above-mentioned resin composition composed mainly of the above-mentioned epoxy compound and the above-mentioned polycarbodiimide resin, the proportion of the polycarbodiimide resin being 0.1 to 10 parts by weight relative to 100 parts by weight of the epoxy compound,
  an epoxy resin curing agent,
  an epoxy resin curing accelerator, and
  an inorganic powder,
and is liquid or fluid at ordinary temperature.

As to the curing agent for epoxy compound, used in the present liquid sealant, there is no particular restriction as long as the present liquid sealant can have fluidity. The curing agent can be an ordinary curing agent for epoxy resin but is preferably a latent curing agent promising good storage stability. Such a curing agent can be exemplified by an acid anhydride, imidazole, dicyandiamide and phenol. Of them, preferred is an acid anhydride which is liquid at ordinary temperature, such as methyltetrahydrophthalic acid anhydride, methylnadic acid anhydride or the like.

As to the curing accelerator for epoxy compound, used in the present liquid sealant, there is no particular restriction, either, as long as it is a generally used curing accelerator. There can be mentioned, for example, imidazole, triphenylphosphorene and an adduct of bisphenol A type epoxy resin and a phenolic compound.

The amounts of the epoxy compound curing agent and the epoxy compound curing accelerator used differ depending upon their kinds used but may be amounts generally used.

As to the inorganic powder used in the present liquid sealant, there is no particular restriction, either, as long as it is a generally used inorganic powder. There can be mentioned, for example, mica, silica, calcium carbonate, talc, alumina and zirconium silicate.

The amount of the inorganic powder used differs depending upon the particle diameter of the powder but is preferably 25 to 75% by weight of the total weight of the present liquid sealant. When the amount is too large, the resulting sealant has a problem in fluidity. When the amount is too small, the resulting sealant has no sufficiently low linear expansion coefficient.

The present liquid sealant can be produced as follows.

First, there are weighed, by required amounts, a present resin composition, an epoxy resin curing agent, an epoxy resin curing accelerator, an inorganic powder (all mentioned above) and other optional components, and they are mixed uniformly.

The mixing can be conducted by any method generally used. It can be conducted, for example, by a three-roll mill, a multi-purpose mixer, a kneader or an automated mortar. Heating can be applied optionally. Such mixing under heating is useful particularly when components excluding the curing agent and the curing accelerator are mixed first. The mixing is conducted until a uniform mixture is obtained, whereby a liquid sealant is produced.

The thus-obtained liquid sealant of the present invention is liquid and fluid at ordinary temperature although the degree of the fluidity differs depending upon the properties of the materials (e.g. the present resin composition) used. The indexes for fluidity include viscosity, and the present resin composition has a viscosity of 2,500 dPa·s or less as measured at 25° C. by a B type viscometer.

In applying the present liquid sealant, it is poured (or dropped) into a site to be sealed and then is heat-cured. The conditions for heat-curing are those used in curing an ordinary epoxy resin and differ depending upon the kinds of the curing agent and the curing accelerator used in the sealant; however, by heating the poured (or dropped) sealant at 100 to 200° C. for about 30 minutes to 10 hours, a reaction is allowed to proceed, the sealant is cured, and sealing is completed. In this case, no molding pressure is necessary, but a pressure may be applied unless no problem arises.

EXAMPLES

The present invention is described in more detail below by way of Examples.

Synthesis of Polycarbodiimide resins

Synthesis Example 1

500 g of tetramethylxylylene diisocyanate (TMXDI) was stirred in the presence of 5.0 g of 1-phenyl-3-methyl-2-phosphorene-1-oxide (a carbodiimidization catalyst) in a nitrogen atmosphere at 180° C. for 10 hours to conduct a reaction, whereby a polycarbodiimide resin (Mn=1,300) was obtained.

Synthesis Example 2

100 g of diphenylmethane-4,4-isocyanate (MDI) was reacted under refluxing in a mixed solvent consisting of 80 g of THF and 75 g of ethyl acetate for 2.5 hours, followed by cooling to 5° C. to precipitate a polycarbodiimide resin. The resin was collected by filtration to obtain a polycarbodiimide resin powder (Mn=7,000).

Synthesis Example 3

50 g of toluene diisocyanate (TDI) was reacted under refluxing in the presence of 0.05 g of 1-phenyl-3-methyl-2-phosphorene-1-oxide in 235 g of a solvent (THF) for 6 hours, to obtain a polycarbodiimide resin solution (Mn=11,000).

Preparation of liquid sealants

Example 1

To 100 parts by weight of a bisphenol A type epoxy resin were added 3 parts by weight of the TMXDI-based liquid polycarbodiimide resin obtained in Synthesis Example 1, 82 parts by weight of methyltetrahydrophthalic acid anhydride (a curing agent), 4 parts by weight of imidazole (a curing accelerator) and 300 parts by weight of fused silica (an inorganic powder) having an average particle diameter of 10 μm. They were uniformly mixed by the use of a three-roll mill to obtain a liquid sealant 1.

Example 2

To 100 parts by weight of a bisphenol A type epoxy resin were added 3 parts by weight of the MDI-based polycarbodiimide resin powder obtained in Synthesis Example 2, 110 parts by weight of methylnadic acid anhydride (a curing agent), 4 parts by weight of imidazole (a curing accelerator) and 350 parts by weight of fused silica (an inorganic powder) having an average particle diameter of 10 μm. They were uniformly mixed by the use of a three-roll mill to obtain a liquid sealant 2.

Example 3

A liquid sealant 3 was obtained in the same manner as in Example 2 except that the MDI-based polycarbodiimide resin powder was replaced by the TDI-based polycarbodiimide resin solution obtained in Synthesis Example 3 and, after mixing, solvent removal was conducted.

Comparative Example 1

A liquid sealant 4 was obtained in the same manner as in Example 1 except that no polycarbodiimide resin was used.

Comparative Example 2

A liquid sealant 5 was obtained in the same manner as in Example 1 except that the bisphenol A type epoxy resin was changed to a biphenyl type epoxy resin.
Preparation of test pieces A silicon chip having an aluminum wiring was adhered to a 42 alloy frame. The resulting material was placed in a mold, and one of the liquid sealants 1 to 5 was heated to 40° C. and poured into the mold. The sealant was cured under the conditions of 150° C. and one hour to conduct sealing, to prepare a flat package type sealed semiconductor device. The thus-obtained devices were used as test pieces.
Evaluations
Viscosity
Was measured at 25° C. by the use of a B type viscometer.
Fluidity Each test piece was cut at several places in a vertical direction of substrate to visually examine whether or not the sealing by simple pouring of liquid sealant gave uniform sealing. When the simple pouring gave uniform sealing, the rating was "o"; when the simple sealing gave nonuniform sealing, the rating was "x".
Soldering heat resistance Each test piece was allowed to stand for 72 hours under the conditions of 85° C. and 85% RH to allow the test piece absorb moisture and then was immersed in a solder bath of 240° C. for 20 seconds. This operation was conducted twice. Thereafter, the test piece was examined for the cracking and peeling of sealant layer or the interface between sealant and substrate, and (times of generation of cracking and peeling)/(times of test) was determined as the soldering heat resistance of the test piece.
Results The results are shown in Table 1.

TABLE 1

| | Sealant | Viscosity (dPa.s) | Fluidity | Soldering heat resistance |
|---|---|---|---|---|
| Example 1 | Sealant 1 | 300 | o | 0/8 |
| Example 2 | Sealant 2 | 250 | o | 0/8 |
| Example 3 | Sealant 3 | 250 | o | 0/8 |
| Comparative Example 1 | Sealant 4 | 300 | o | 4/8 |
| Comparative Example 2 | Sealant 5 | 2800 | x | 1/8 |

As is clear from the above description and Table 1, the liquid sealant of the present invention has a low viscosity; therefore, enables sufficient sealing of substrate by being poured or dropped into the site of substrate to be sealed, then heated and cured; and makes possible molding wherein the substrate to be sealed receives substantially no molding pressure.

Moreover, the liquid sealant of the present invention, even when a substrate sealed therewith is immersed in a solder bath, causes no cracking or peeling in the sealant layer or the interface between sealant and substrate, that is, is superior in moisture resistance and soldering heat resistance; therefore, causes no cracking or peeling after curing even when a sealed electronic part is mounted by a reflow soldering method wherein the whole portion of the part is heated.

The above-mentioned meritorious effects of the present sealant can be obtained by using the resin composition for a liquid sealant according to the present invention.

What is claimed is:

1. A resin composition for use in a liquid sealant, which is composed mainly of an epoxy compound, a polycarbodiimide resin and an epoxy resin curing agent, the proportion of the polycarbodiimide resin being 0.1 to 10 parts by weight relative to 100 parts by weight of the epoxy compound, and the epoxy resin curing agent being selected from the group consisting of an acid anhydride, imidazole, dicyandiamide and phenol, the resin composition being liquid or fluid at ordinary temperature.

2. A resin composition according to claim 1, wherein the epoxy compound comprises a compound having at least two epoxy groups in the molecule as an essential component.

3. A liquid sealant comprising:

a resin composition which is composed mainly of an epoxy compound and a polycarbodiimide resin, the proportion of the polycarbodiimide resin being 0.1 to 10 parts by weight relative to 100 parts by weight of the epoxy compound, an epoxy resin curing agent selected from the group consisting of an acid anhydride, imidazole, dicyandiamide and phenol, an epoxy resin curing accelerator, and an inorganic powder, which liquid sealant is liquid or fluid at ordinary temperature.

4. A liquid sealant according to claim 3, wherein the epoxy compound in the resin composition comprises a compound having at least two epoxy groups in the molecule as an essential component.

5. A resin composition according to claim 1, wherein the acid anhydride is methyltetrahydrophthalic acid anhydride or methylnadic acid anhydride.

6. A liquid sealant according to claim 3, wherein the acid anhydride is methyltetrahydrophthalic acid anhydride or methylnadic acid anhydride.

* * * * *